(12) United States Patent
Puckett et al.

(10) Patent No.: US 11,828,981 B2
(45) Date of Patent: Nov. 28, 2023

(54) OPTICAL DEVICE WITH GRADED INDEX PLANAR LENS

(71) Applicant: Honeywell International Inc., Charlotte, NC (US)

(72) Inventors: Matthew Wade Puckett, Phoenix, AZ (US); Chad Hoyt, Roseville, MN (US); Chad Fertig, Bloomington, MN (US); Matthew Robbins, Minneapolis, MN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/697,565

(22) Filed: Mar. 17, 2022

(65) Prior Publication Data

US 2023/0296832 A1    Sep. 21, 2023

(51) Int. Cl.
*G02B 6/12* (2006.01)
*G02B 3/00* (2006.01)
*G02B 27/30* (2006.01)

(52) U.S. Cl.
CPC ....... *G02B 6/12007* (2013.01); *G02B 3/0087* (2013.01); *G02B 27/30* (2013.01); *G02B 2003/0093* (2013.01); *G02B 2006/12102* (2013.01)

(58) Field of Classification Search
CPC .............. G02B 3/0087; G02B 27/30; G02B 2003/0093; G02B 2006/2102
See application file for complete search history.

(56) References Cited

U.S. PATENT DOCUMENTS

| | | | |
|---|---|---|---|
| 7,546,009 | B2 | 6/2009 | Kukulj et al. |
| 10,261,389 | B2 | 4/2019 | Skirlo et al. |
| 11,029,529 | B2 | 6/2021 | Chou et al. |
| 11,175,562 | B2 | 11/2021 | Skirlo et al. |
| 2019/0044003 | A1 | 2/2019 | Heck et al. |

FOREIGN PATENT DOCUMENTS

CN    105762526 A    7/2016

OTHER PUBLICATIONS

Cheben et al., Subwavelength waveguide grating for mode conversion and light coupling in integrated optics, Opt. Express 14, 4695-4702 (2006) (Year: 2006).*

(Continued)

*Primary Examiner* — Peter Radkowski
(74) *Attorney, Agent, or Firm* — Fogg & Powers LLC (57) ABSTRACT

An optical device comprises a waveguide core layer that includes a planar lens structure having a first end and a second end, with the planar lens structure including a plurality of lens tapers extending from at least one of the first or seconds ends in a convex-shaped array. The waveguide core layer also includes a waveguide slab that adjoins with the planar lens structure, such that the waveguide slab is in optical communication with the plurality of lens tapers. The plurality of lens tapers are configured to adiabatically transition an index of refraction from a first index value, external to the planar lens structure, to a second index value, internal to the planar lens structure.

20 Claims, 6 Drawing Sheets

(56) References Cited

OTHER PUBLICATIONS

Halir et al., Waveguide subwavelength structures : a review of principles and applications, Laser Photonics Rev. 9, No. 1, 25-49 (2015) / DOI 10.1002/lpor.201400083. (Year: 2016).*

Luque-González et al., A review of silicon subwavelength gratings: building break-through devices with anisotropic metamaterials Nanophotonics, vol. 10, No. 11, 2021, pp. 2765-2797. https://doi.org/10.1515/nanoph-2021-0110 (Year: 2021).*

Wang et al., On-chip wavefront shaping with dielectric metasurface. Nat Commun 10, 3547 (2019). https://doi.org/10.1038/s41467-019-11578-y (Year: 2019).*

Mu et al., Edge Couplers in Silicon Photonic Integrated Circuits: A Review. Applied Sciences (2020): Appl. Sci. 2020, 10, 1538; doi: 10.3390/app10041538 (Year: 2020).*

Sánchez-Postigo et al., Breaking the Coupling Efficiency-Bandwidth Trade-Off in Surface Grating Couplers Using Zero-Order Radiation. Laser & Photonics Reviews. 15. 10.1002/lpor.202000542. 2021 (Year: 2021).*

Schmid et al., Subwavelength Grating Structures in Silicon-on-Insulator Waveguides, Advances in Optical Technologies, vol. 2008, Article ID 685489, 8 pages, 2008. https://doi.org/10.1155/2008/685489 (Year: 2008).*

Bock et al., Sub-wavelength grating mode transformers in silicon slab waveguides, Opt. Express 17, 19120-19133 (2009) (Year: 2009).*

Zhang et al., Ultrashort and efficient adiabatic waveguide taper based on thin flat focusing lenses, Opt. Express 25, 19894-19903 (2017) (Year: 2017).*

Gabrielli et al. (2011). Integrated Luneburg lens via ultra-strong index gradient on silicon. Optics express. 19. 20122-7. 10.1364/OE.19.020122. 2011 (Year: 2011).*

Luque-González et al., An ultracompact GRIN-lens-based spot size converter using subwavelength grating metamaterials, Laser Photon. Rev., vol. 13, p. 1900172, 2019. (Year: 2019).*

* cited by examiner

OPTICAL DEVICE WITH GRADED INDEX PLANAR LENS

BACKGROUND

In integrated photonics it is often necessary to transition the spatial dimensions of a light wave from a highly confined waveguide state to a more broadly spatially distributed state compatible with free-space optics. One field in which this functionality is desirable is the generation of free-space light beams, derived from integrated photonics waveguides, for use in a magneto-optical trap (MOT).

In prior approaches, planar lenses etched into a waveguide material have been used to collimate light that is expanding across the plane of a photonics chip. However, mode mismatch caused by the definition of these planar lenses can lead to optical losses. In such prior approaches, the refractive index of the planar lens face is changed abruptly, typically by etching partially though a slab of waveguide material. This results in reflection, as well as optical loss due to spatial mode mismatch at the boundary.

For the production of atom traps such as a MOT, on-chip optical losses need to be kept to a minimum. Accordingly, there is a need to increase the optical throughput of planar lenses used to produce the light beams that form such atom traps.

SUMMARY

An optical device comprises a waveguide core layer that includes a planar lens structure having a first end and a second end, with the planar lens structure including a plurality of lens tapers extending from at least one of the first or seconds ends in a convex-shaped array. The waveguide core layer also includes a waveguide slab that adjoins with the planar lens structure, such that the waveguide slab is in optical communication with the plurality of lens tapers. The plurality of lens tapers are configured to adiabatically transition an index of refraction from a first index value, external to the planar lens structure, to a second index value, internal to the planar lens structure.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

An optical device that includes a graded index planar lens is described herein, which can be employed in various photonic integrated circuit applications.

As mentioned above, planar lenses etched into a waveguide material have been used to collimate light that is expanding across the plane of a photonics chip, however, mode mismatch caused by the definition of the lens can lead to optical loss. In the present approach, this source of optical loss is eliminated or reduced by introducing a graded effective index across the front face of the lens, increasing optical throughput of the device. This graded index planar lens can be formed with an array of lens tapers in either the front face or the back face (or both) of the planar lens structure.

For example, a lithographic technique can be employed, such as e-beam lithography or deep ultraviolet (DUV) lithography, to define the planar lens structure in a waveguide core material. The array of lens tapers are formed to adiabatically transition an index of refraction from a first index value, external to the planar lens structure, to a second index value, internal to the planar lens structure.

The effective index of refraction at any cross-sectional position along the array of lens tapers is determined by the width of the lens tapers themselves, reaching a maximum index value for a maximum taper width. As the lens taper width is reduced, the effective index of refraction is gradually reduced from an initial index value to a final index value. This gradual transition (adiabatic transition) eliminates reflection. Additionally, as the lens taper width is reduced, a profile of the optical mode supported by the lens taper array gradually transforms from an initial profile to a final profile. This gradual profile transformation eliminates optical loss due to mode mismatch.

To operate the present optical device, light is injected at a desired wavelength into an input port such as optical waveguide, which is coupled to an input end of the planar lens structure. The light beam is output from the planar lens structure as a collimated beam.

Further details related to the present device are described as follows and with reference to the drawings.

Figure 1:
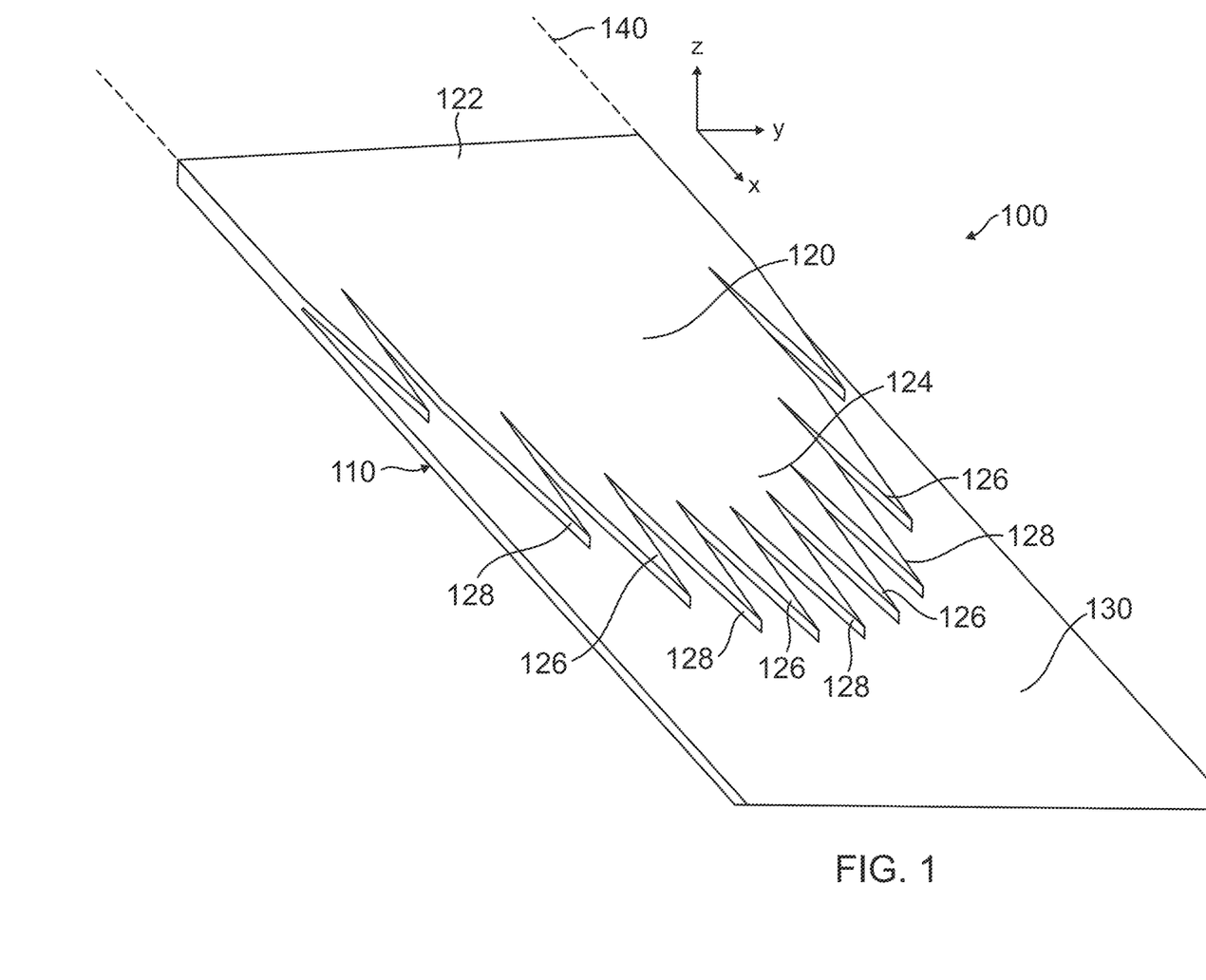
FIG. 1 is a schematic orthogonal view of an optical device with a tapered planar lens, according to one embodiment.

FIG. 1 schematically illustrates an optical device 100, according to one embodiment, which includes a waveguide core layer 110. A planar lens structure 120 is on a first portion of waveguide core layer 110, and a waveguide slab 130 is on a second portion of waveguide core layer 110.

The planar lens structure 120 has a first end 122 and an opposing second end 124. The planar lens structure 120 includes a plurality of lens tapers 126 that extend from second end 124. As shown in the embodiment of FIG. 1, lens tapers 126 extend from second end 124 in a convex-shaped array. The waveguide slab 130 adjoins with planar lens structure 120 such that waveguide slab 130 is in optical communication with lens tapers 126. The lens tapers 126 are configured to adiabatically transition an index of refraction from a first index value, external to planar lens structure 120, to a second index value, internal to planar lens structure 120. In one embodiment, first end 122 of planar lens structure 120 is coupled to an input waveguide 140.

The waveguide core layer 110 is substantially planar such that waveguide slab 130 is substantially planar with respect planar lens structure 120. The planar lens structure 120 and waveguide slab 130 are configured such that a light beam that propagates in planar lens structure 120 diffracts into waveguide slab 130 along substantially the same plane and direction. The light beam is output from waveguide slab 130 as a collimated beam.

As illustrated in FIG. 1, planar lens structure 120 is formed to have a first thickness, and waveguide slab 130 is formed to have a second thickness that is less than the first thickness. In various embodiments, planar lens structure 120 can have a thickness of about 50 nm to about 100 nm, and output slab 130 can have a thickness of about 25 nm to about 50 nm.

The plurality of lens tapers 126 of planar lens structure 120 have opposing tapered sidewalls 128. A width of each lens taper 126 is defined by a narrowing distance between the opposing tapered sidewalls 128. In one embodiment, planar lens structure 120 is formed as is a graded index planar lens, and lens tapers 126 collectively have a substantially parabolic shape.

The planar lens structure 120 and waveguide slab 130 can be formed in waveguide core layer 110 using standard microfabrication techniques, such as conventional deposition, lithography, etching, and resist removal process steps.

Figure 2:
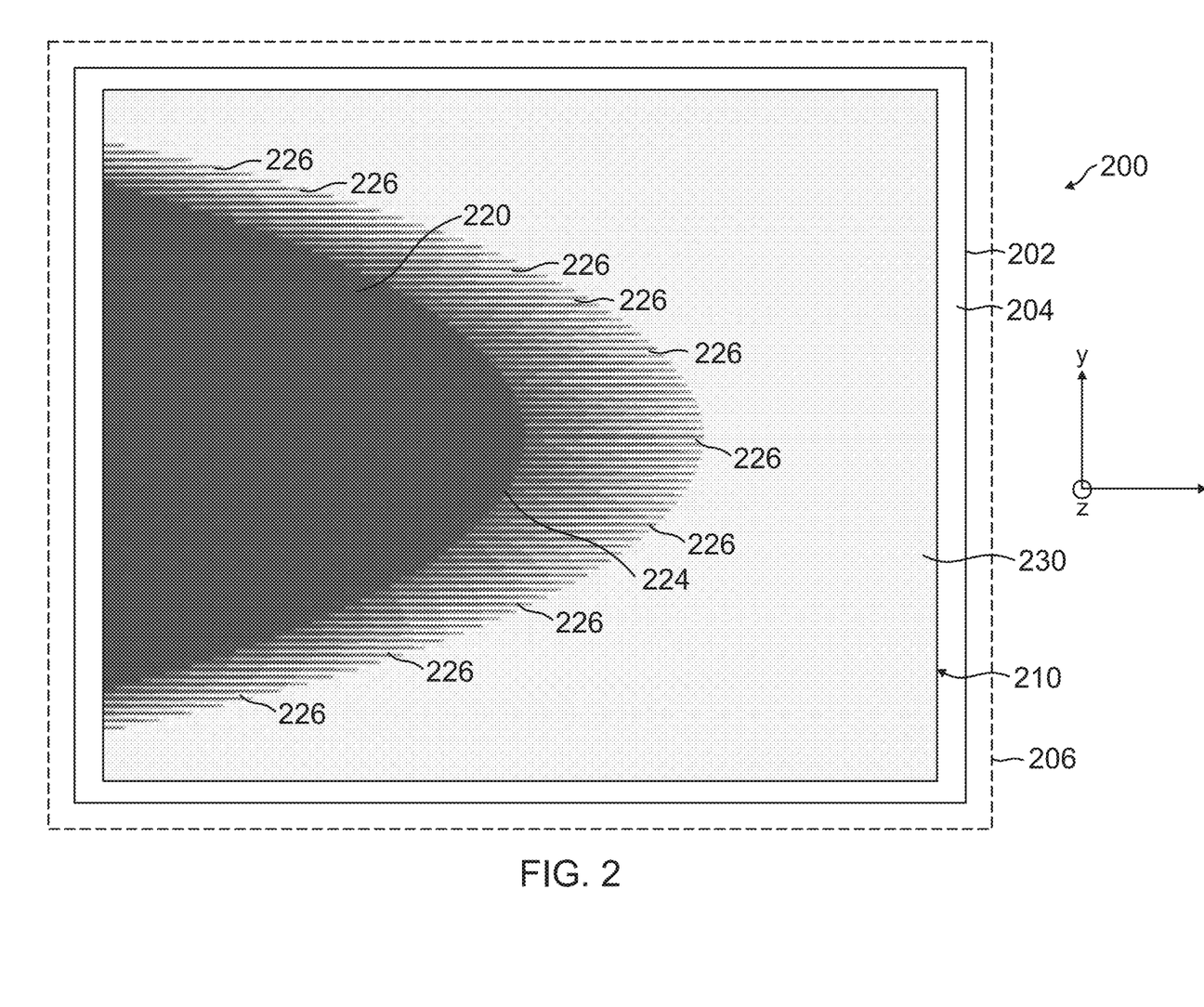
FIG. 2 is a schematic top plan view of an optical device with a tapered planar lens, according to another embodiment.

FIG. 2 is a schematic top view of an optical device 200, according to another embodiment. The optical device 200 includes a substrate 202 having an upper surface 204, and a waveguide core layer 210 on upper surface 204. A planar lens structure 220 is formed from a first portion of waveguide core layer 210, and a waveguide slab 230 is formed on a second portion of waveguide core layer 210. The substrate 202 supports waveguide core layer 210 including planar lens structure 220 and waveguide slab 230. The substrate 202 can be formed on a photonic integrated circuit 206, such as a silicon photonics chip, for example.

The substrate 202 can be a bottom cladding layer composed of a first material having a first (lower) refractive index, such as silicon dioxide ($SiO_2$), aluminum oxide ($Al_2O_3$), magnesium oxide (MgO), potassium chloride (KCl), combinations thereof, or the like. The waveguide core layer 210 is composed of a second (higher) refractive index material, such as silicon nitride ($Si_3N_4$), silicon (Si), titanium dioxide ($TiO_2$), gallium arsenide (GaAs), gallium nitride (GaN), combinations thereof, or the like.

The planar lens structure 220 has an output face 224, and a plurality of lens tapers 226 extend from output face 224. As shown in the embodiment of FIG. 2, lens tapers 226 extend from output face 224 in a convex-shaped array. The waveguide slab 230 adjoins with planar lens structure 220 such that waveguide slab 230 is in optical communication with lens tapers 226. The lens tapers 226 are configured to adiabatically transition an index of refraction from a first index value, external to planar lens structure 220, to a second index value, internal to planar lens structure 220. In one embodiment, planar lens structure 220 is formed as a graded index planar lens, and lens tapers 226 collectively have a substantially parabolic shape.

The waveguide core layer 210 is substantially planar such that waveguide slab 230 is substantially planar with respect planar lens structure 220. The planar lens structure 220 and waveguide slab 230 are configured such that a light beam that propagates in planar lens structure 220 diffracts into waveguide slab 230 along substantially the same plane and direction. The light beam is output from waveguide slab 230 as a collimated beam.

The planar lens structure 220 and waveguide slab 230 can be formed in waveguide core layer 210, on substrate 202 and photonic integrated circuit 206, using standard microfabrication techniques. Optionally, a top cladding layer can be formed over planar lens structure 220 and waveguide slab 230. The top cladding layer can be formed of the same material as the bottom cladding layer, including the first material having the first refractive index, as described above.

As mentioned previously, planar lenses etched into a waveguide material have been used to collimate light that is expanding across the plane of a photonics chip. For example, light that is diverging in a two-dimensional (2D) plane can be collimated by using an index contrast provided by a planar lens. The planar lens is defined by etching partway through a waveguide core material with high refractive index, and surrounding the waveguide core material with a low refractive index cladding. In this conventional approach, there is substantial optical loss at the boundary defining the planar lens due to reflection and optical mode mismatch. In the present approach, by introducing tapers to the planar lens, both reflection and mode mismatch are reduced, yielding higher transmission because of a decreased optical power loss, while still preserving focusing provided by the collimated light. These features and benefits are illustrated in the following examples.

Figure 3A:
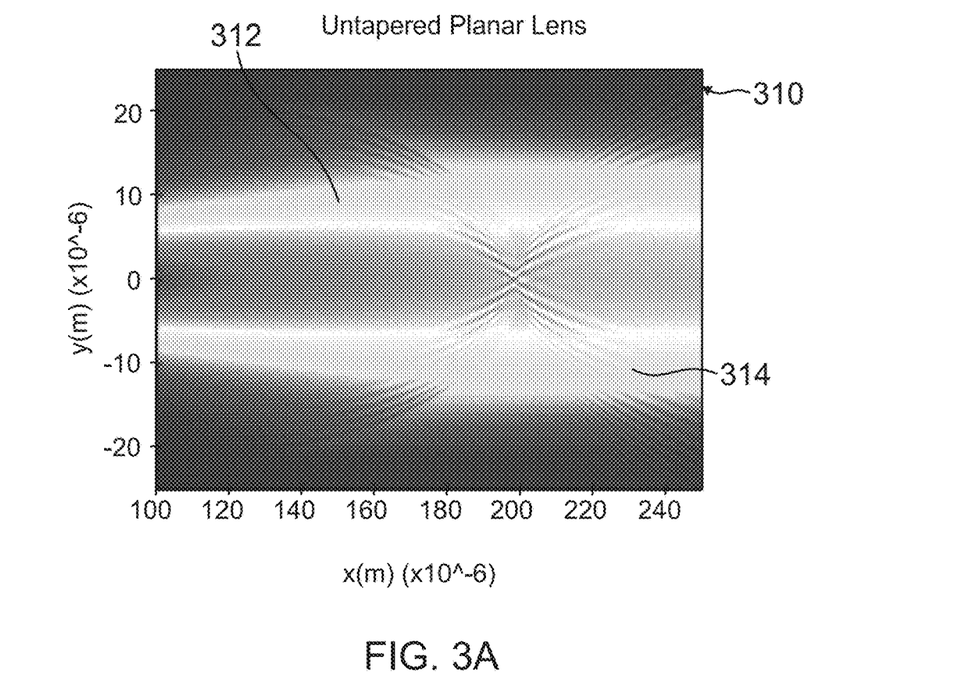
FIGS. 3A and 3B depict theoretical simulations of respective axial views of the operation of a conventional planar lens without tapers.
Figure 3B:
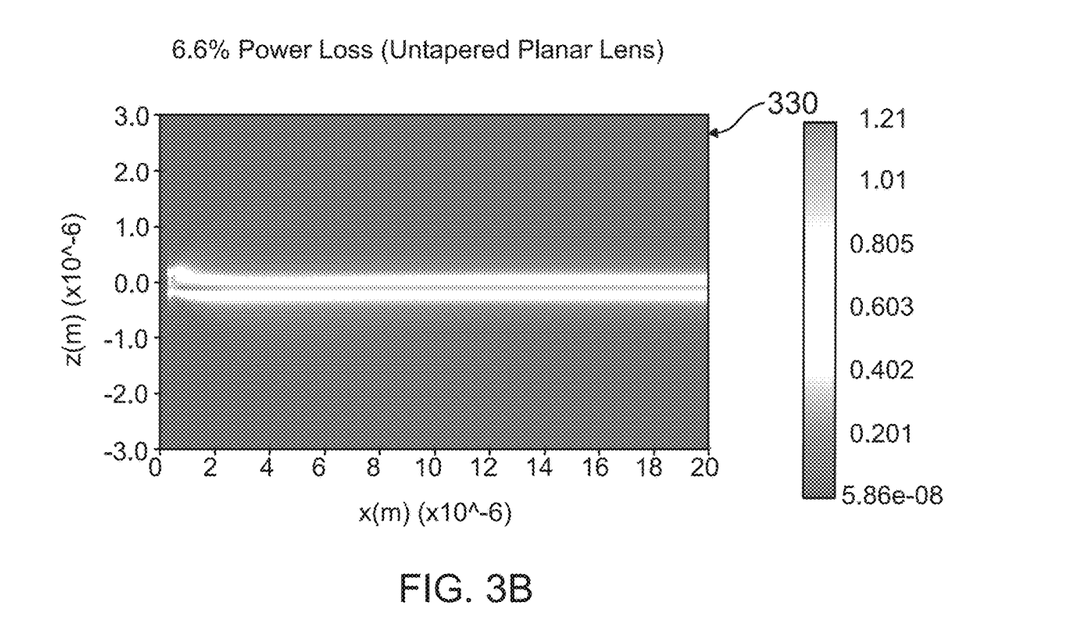

FIGS. 3A and 3B are example theoretical simulations of respective axial views of the operation of a conventional untapered planar lens. FIG. 3A depicts a first slice 310 viewed along a z-axis (showing x-y plane), and FIG. 3B depicts a second slice 320 viewed along a y-axis (showing x-z plane). FIG. 3A shows a diverging region 312 of light traversing through the untapered planar lens, and a collimated region 314 of the light exiting out of the untapered planar lens. FIG. 3B indicates that there is a 6.6% optical power loss when using the untapered planar lens.

Figure 4A:
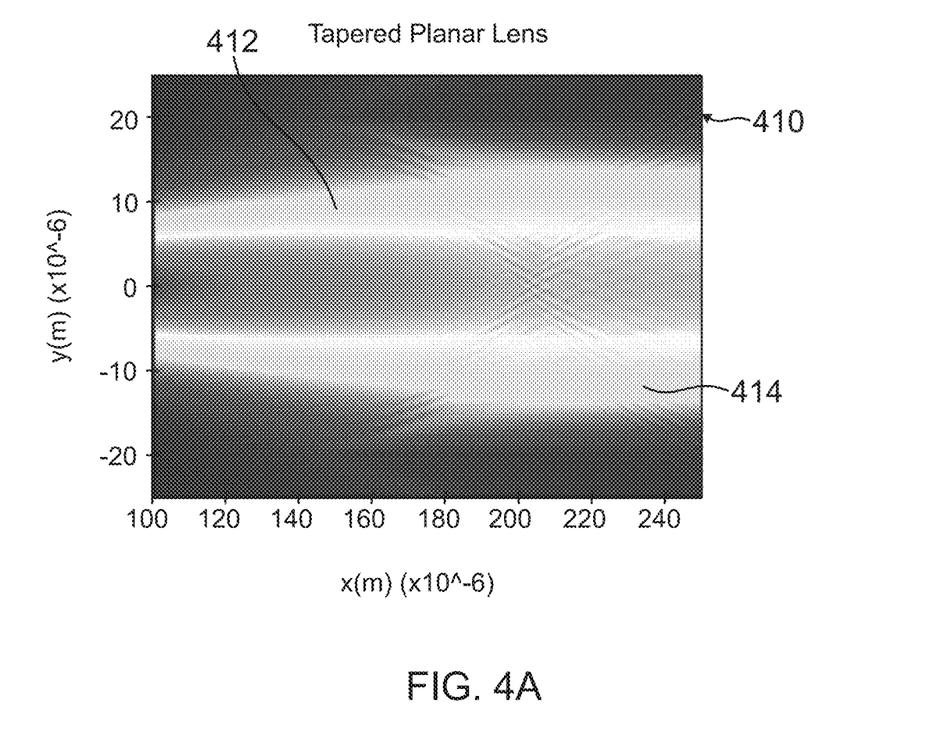
FIGS. 4A and 4B depict theoretical simulations of respective axial views of the operation of a tapered planar lens.
Figure 4B:
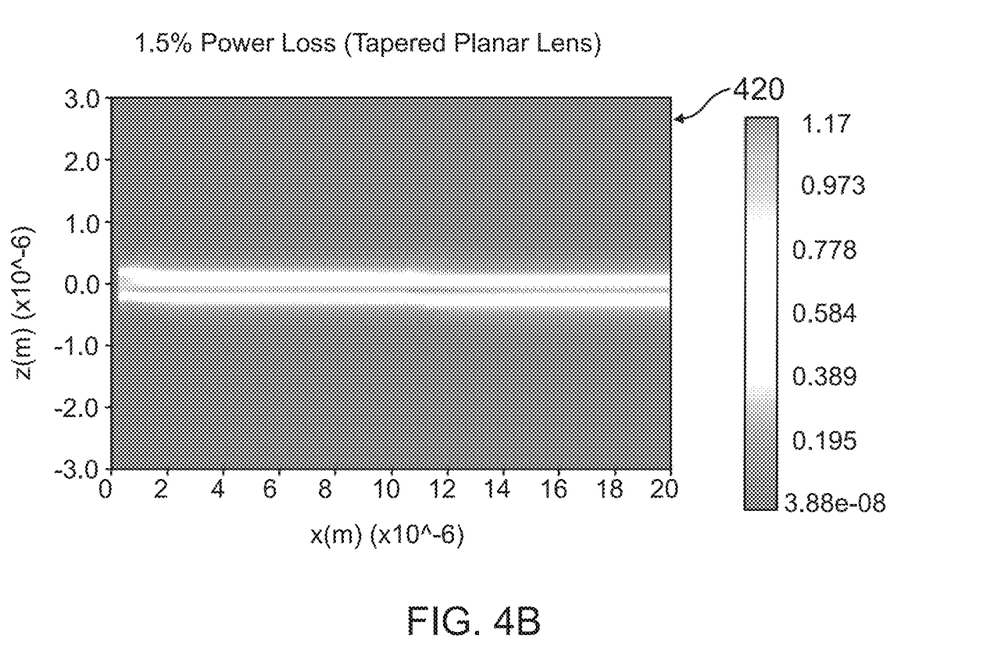

FIGS. 4A and 4B are example theoretical simulations of respective axial views of the operation of a tapered planar lens, such as the planar lens structure with tapers as shown in FIG. 1. FIG. 4A depicts a first slice 410 viewed along the z-axis (showing x-y plane), and FIG. 4B shows a second slice 420 viewed along the y-axis (showing x-z plane). FIG. 4A shows a diverging region 412 of light traversing through the tapered planar lens, and a collimated region 414 of the light exiting out of the tapered planar lens. FIG. 4B indicates that there is only a 1.5% optical power loss when using the tapered planar lens.

Figure 5:
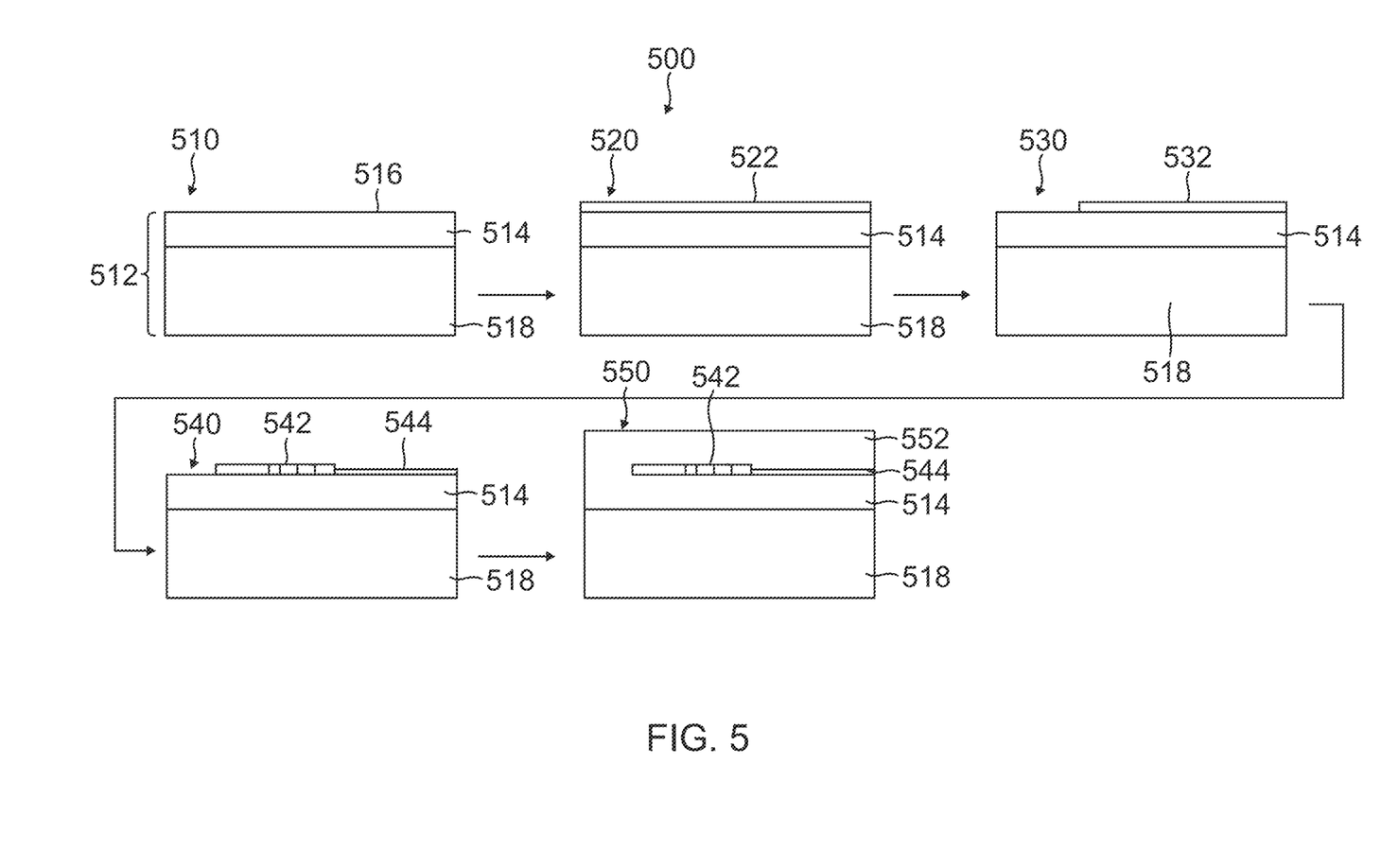
FIG. 5 illustrates schematic side views of a method for fabricating an optical device including a tapered planar lens, according to an exemplary approach.

FIG. 5 illustrates schematic side views of a method 500 for fabricating an optical device including a tapered planar lens, such as described above, according to one exemplary approach. Initially, as shown at 510, a substrate 512 is provided, such as an initial wafer, which includes a bottom cladding layer 514 with an upper surface 516. The bottom cladding layer 514 includes a first material having a first (lower) refractive index. The substrate 512 can also include an underlying handle wafer 518, which supports bottom cladding layer 514. The substrate 512 can be coupled to a photonics chip.

As depicted at 520, a core layer 522 is deposited on upper surface 516 of cladding layer 514, such as by a conventional deposition process. The core layer 522 includes a second material having a second (higher) refractive index that is greater than the first refractive index of the first material.

Next, as shown at 530, a waveguide layer 532 is formed from core layer 522. The waveguide layer 532 can be formed through standard lithography, etching, and resist removal steps. Thereafter, as depicted at 540, a tapered planar lens structure 542 and an output slab 544 are formed from waveguide layer 532, such as through additional lithography, etching, and resist removal steps.

Optionally, as shown at 550, a top cladding layer 552 can be formed over tapered planar lens structure 542, output slab 544, and exposed portions of bottom cladding layer 514, such as by a conventional deposition process. The top cladding layer 552 can include the first material having a lower refractive index.

Figure 6:
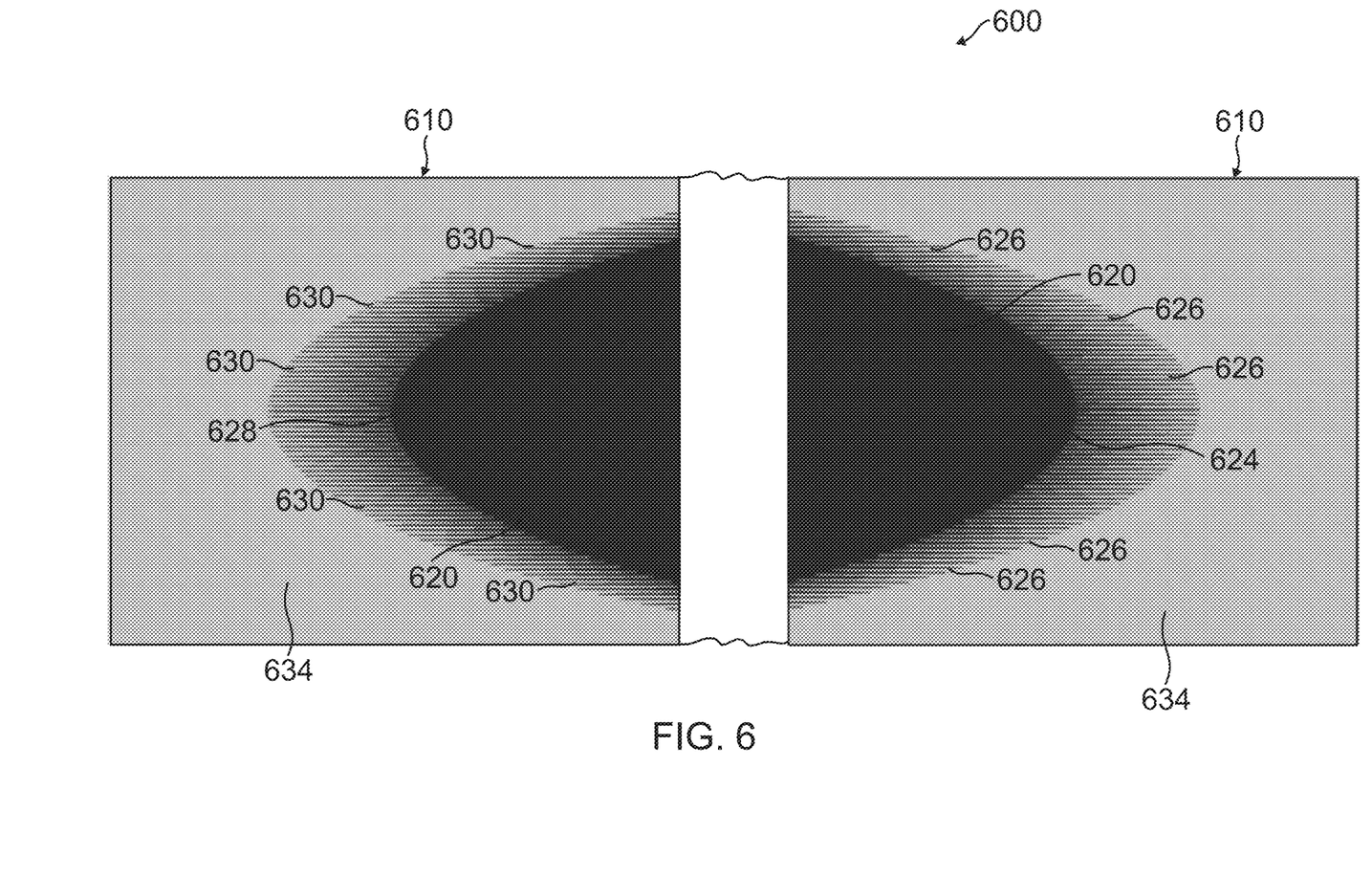
FIG. 6 is a schematic top plan view of an optical device with a tapered planar lens, according to a further embodiment.

FIG. 6 is a schematic top view of an optical device 600, according to a further embodiment. The optical device 600 includes a waveguide core layer 610, which includes a planar lens structure 620 and a waveguide slab 634. The planar lens structure 620 includes a front face 624 with a first set of lens tapers 626 extending therefrom, and a back face 628 with a second set of lens tapers 630 extending therefrom.

As shown in the embodiment of FIG. 6, lens tapers 626 and 630 are formed in convex-shaped arrays. The waveguide slab 634 adjoins with planar lens structure 620 such that waveguide slab 634 is in optical communication with lens tapers 626 and 630. The lens tapers 626 and 630 are configured to adiabatically transition an index of refraction from a first index value, external to planar lens structure 620, to a second index value, internal to planar lens structure 620. In one embodiment, planar lens structure 620 is formed as a graded index planar lens, and lens tapers 626 and 630 collectively having substantially parabolic shapes.

The waveguide core layer 610 is substantially planar such that waveguide slab 634 is substantially planar with respect to planar lens structure 620. The planar lens structure 620 and waveguide slab 634 are configured such that a light beam that propagates in planar lens structure 620 diffracts into waveguide slab 634 along substantially the same plane and direction. The light beam is output from waveguide slab 634 as a collimated beam.

The planar lens structure 620 and waveguide slab 634 can be formed in waveguide core layer 610 using standard microfabrication techniques. The planar lens structure 620 and waveguide slab 634 can be formed of the same materials as described above for previous embodiments.

EXAMPLE EMBODIMENTS

Example 1 includes an optical device comprising: a waveguide core layer, comprising: a planar lens structure having a first end and a second end, the planar lens structure including a plurality of lens tapers extending from at least one of the first or second ends in a convex-shaped array; and a waveguide slab that adjoins with the planar lens structure such that the waveguide slab is in optical communication with the plurality of lens tapers; wherein the plurality of lens tapers are configured to adiabatically transition an index of refraction from a first index value, external to the planar lens structure, to a second index value, internal to the planar lens structure.

Example 2 includes the optical device of Example 1, wherein the waveguide core layer is substantially planar such that the waveguide slab is substantially planar with respect the planar lens structure.

Example 3 includes the optical device of any of Examples 1-2, wherein the planar lens structure and the waveguide slab are configured such that a light beam that propagates in the planar lens structure diffracts into the waveguide slab along substantially the same plane and direction.

Example 4 includes the optical device of Example 3, wherein the light beam is output from the waveguide slab as a collimated beam.

Example 5 includes the optical device of any of Examples 1-4, wherein the planar lens structure has a first thickness, and the waveguide slab has a second thickness that is less than the first thickness.

Example 6 includes the optical device of any of Examples 1-5, wherein each of the plurality of lens tapers has opposing tapered sidewalls, and a width of each of the plurality of lens tapers is defined by a narrowing distance between the opposing tapered sidewalls.

Example 7 includes the optical device of any of Examples 1-6, wherein the planar lens structure is a graded index planar lens.

Example 8 includes the optical device of any of Examples 1-7, wherein the plurality of lens tapers collectively have a substantially parabolic shape.

Example 9 includes the optical device of any of Examples 1-8, further comprising: a substrate that supports the waveguide core layer including the planar lens structure and the waveguide slab.

Example 10 includes the optical device of Example 9, wherein the substrate is coupled to a photonic integrated circuit.

Example 11 includes the optical device of any of Examples 9-10, wherein: the substrate comprises a bottom cladding layer that includes a first material having a first refractive index; and the waveguide core layer includes a second material having a second refractive index that is greater than the first refractive index.

Example 12 includes the optical device of Example 11, wherein the first material comprises silicon dioxide, aluminum oxide, magnesium oxide, potassium chloride, or combinations thereof.

Example 13 includes the optical device of any of Examples 11-12, wherein the second material comprises silicon nitride, silicon, titanium dioxide, gallium arsenide, gallium nitride, or combinations thereof.

Example 14 includes the optical device of any of Examples 11-13, further comprising: a top cladding layer over the planar lens structure and the waveguide slab, the top cladding layer including the first material having the first refractive index.

Example 15 includes the optical device of any of Examples 1-14, wherein the plurality of lens tapers are located at both the first and second ends of the planar lens structure.

Example 16 includes a device comprising: an integrated photonics chip; an input waveguide on the photonics chip; and a waveguide core layer on the photonics chip and optically coupled to the input waveguide, the waveguide core layer comprising: a graded index planar lens having a first end and a second end, the graded index planar lens including a plurality of lens tapers extending from at least one of the first or second ends in a convex array; and a waveguide slab that adjoins with the graded index planar lens such that the waveguide slab is in optical communication with the plurality of lens tapers; wherein the plurality of lens tapers are configured to adiabatically transition an index of refraction from a first index value, external to the graded index planar lens, to a second index value, internal to the graded index planar lens.

Example 17 includes the device of Example 16, wherein each of the plurality of lens tapers has opposing tapered sidewalls, and a width of each of the plurality of lens tapers is defined by a narrowing distance between the opposing tapered sidewalls.

Example 18 includes the device of any of Examples 16-17, wherein the waveguide core layer is substantially planar such that the waveguide slab is substantially planar with respect to the graded index planar lens; and the graded index planar lens and the waveguide slab are configured such that a light beam that propagates in the graded index planar lens diffracts into the waveguide slab along substantially the same plane and direction, wherein the light beam is output from the waveguide slab as a collimated beam.

Example 19 includes the device of any of Examples 16-18, wherein the graded index planar lens and the waveguide slab are embedded in a cladding layer.

Example 20 includes the device of any of Examples 16-19, wherein the plurality of lens tapers are located at both the first and second ends of the graded index planar lens.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. An optical device, comprising:
a waveguide core layer, comprising:
a planar lens structure having a first end and a second end, the planar lens structure including a plurality of lens tapers extending from at least one of the first or second ends in a convex-shaped array; and
a waveguide slab that adjoins with the planar lens structure such that the waveguide slab is in optical communication with the plurality of lens tapers;
wherein the plurality of lens tapers are configured to adiabatically transition an index of refraction from a first index value, external to the planar lens structure, to a second index value, internal to the planar lens structure;
wherein an effective refractive index at cross-sectional positions along the plurality of lens tapers is determined by a width of each lens taper, such that the effective refractive index has a maximum index value where each lens taper has a maximum width value, and as the width of each lens taper is gradually reduced along a length thereof, the effective refractive index is correspondingly gradually transitioned to a final index value that is less than the maximum index value.

2. The optical device of claim 1, wherein the waveguide core layer is substantially planar such that the waveguide slab is substantially planar with respect the planar lens structure.

3. The optical device of claim 2, wherein the planar lens structure and the waveguide slab are configured such that a light beam that propagates in the planar lens structure diffracts into the waveguide slab along substantially the same plane and direction.

4. The optical device of claim 3, wherein the light beam is output from the waveguide slab as a collimated beam.

5. The optical device of claim 1, wherein the planar lens structure has a first thickness, and the waveguide slab has a second thickness that is less than the first thickness.

6. The optical device of claim 1, wherein each of the plurality of lens tapers has opposing tapered sidewalls, and the width of each of the plurality of lens tapers is defined by a narrowing distance between the opposing tapered sidewalls.

7. The optical device of claim 1, wherein the planar lens structure is a graded index planar lens.

8. The optical device of claim 1, wherein the plurality of lens tapers collectively have a substantially parabolic shape.

9. The optical device of claim 1, further comprising:
a substrate that supports the waveguide core layer including the planar lens structure and the waveguide slab.

10. The optical device of claim 9, wherein the substrate is coupled to a photonic integrated circuit.

11. The optical device of claim 9, wherein:
the substrate comprises a bottom cladding layer that includes a first material having a first refractive index; and
the waveguide core layer includes a second material having a second refractive index that is greater than the first refractive index.

12. The optical device of claim 11, wherein the first material comprises silicon dioxide, aluminum oxide, magnesium oxide, potassium chloride, or combinations thereof.

13. The optical device of claim 11, wherein the second material comprises silicon nitride, silicon, titanium dioxide, gallium arsenide, gallium nitride, or combinations thereof.

14. The optical device of claim 11, further comprising:
a top cladding layer over the planar lens structure and the waveguide slab, the top cladding layer including the first material having the first refractive index.

15. The optical device of claim 1, wherein the plurality of lens tapers are located at both the first and second ends of the planar lens structure.

16. A device, comprising:
an integrated photonics chip;
an input waveguide on the photonics chip; and
a waveguide core layer on the photonics chip and optically coupled to the input waveguide, the waveguide core layer comprising:
a graded index planar lens having a first end and a second end, the graded index planar lens including a plurality of lens tapers extending from at least one of the first or second ends in a convex array; and
a waveguide slab that adjoins with the graded index planar lens such that the waveguide slab is in optical communication with the plurality of lens tapers;
wherein the plurality of lens tapers are configured to adiabatically transition an index of refraction from a first index value, external to the graded index planar lens, to a second index value, internal to the graded index planar lens;
wherein an effective refractive index at cross-sectional positions along the plurality of lens tapers is determined by a width of each lens taper, such that the effective refractive index has a maximum index value where each lens taper has a maximum width value, and as the width of each lens taper is gradually reduced along a length thereof, the effective refractive index is correspondingly gradually transitioned to a final index value that is less than the maximum index value;
wherein the gradual transition to the final index value substantially reduces or eliminates reflection and mode mismatch, thereby yielding a higher transmission of light through the waveguide slab with decreased optical power loss, while preserving focusing provided by collimating the light.

17. The device of claim 16, wherein each of the plurality of lens tapers has opposing tapered sidewalls, and the width of each of the plurality of lens tapers is defined by a narrowing distance between the opposing tapered sidewalls.

18. The device of claim 16, wherein:
the waveguide core layer is substantially planar such that the waveguide slab is substantially planar with respect to the graded index planar lens; and
the graded index planar lens and the waveguide slab are configured such that a light beam that propagates in the graded index planar lens diffracts into the waveguide slab along substantially the same plane and direction, wherein the light beam is output from the waveguide slab as a collimated beam.

19. The device of claim 16, wherein the graded index planar lens and the waveguide slab are embedded in a cladding layer.

20. The device of claim 16, wherein the plurality of lens tapers are located at both the first and second ends of the graded index planar lens.

* * * * *